US005608220A

United States Patent [19]

Wieser et al.

[11] Patent Number: 5,608,220

[45] Date of Patent: Mar. 4, 1997

[54] INFRARED INTRUSION DETECTOR WITH A MULTI-LAYER MIRROR

[75] Inventors: Dieter Wieser, Zürich; Martin Allemann, Wetzikon; Rene Lange, Hombrechtikon, all of Switzerland

[73] Assignee: Cerberus AG, Mannedorf, Switzerland

[21] Appl. No.: 538,578

[22] Filed: Oct. 3, 1995

[30] Foreign Application Priority Data

Oct. 10, 1994 [EP] European Pat. Off. .............. 94115948

[51] Int. Cl.[6] .............................. G02B 17/00; G01J 5/08

[52] U.S. Cl. .................................... 250/353; 250/DIG. 1; 359/359; 359/360

[58] Field of Search ............................. 250/353, DIG. 1; 359/360, 359

[56] References Cited

U.S. PATENT DOCUMENTS

| | | | |
|---|---|---|---|
| 3,949,259 | 4/1976 | Kostlin et al. | 313/112 |
| 4,199,218 | 4/1980 | Steinhage et al. . | |
| 4,229,066 | 10/1980 | Rancourt et al. | 359/359 |
| 4,245,217 | 1/1981 | Steinhage | 340/555 |
| 4,321,594 | 3/1982 | Galvin et al. | 340/567 |
| 4,792,685 | 12/1988 | Yamakawa | 250/353 |
| 4,939,359 | 7/1990 | Freeman | 250/221 |
| 5,424,718 | 6/1995 | Müller et al. | 340/567 |

FOREIGN PATENT DOCUMENTS

| | | |
|---|---|---|
| 0440112 | 8/1991 | European Pat. Off. . |
| 0617389 | 9/1994 | European Pat. Off. . |
| 59-005683 | 1/1984 | Japan . |

*Primary Examiner*—Constantine Hannaher
*Attorney, Agent, or Firm*—Brumbaugh, Graves, Donohue & Raymond

[57] ABSTRACT

In an infrared intrusion detector, a focusing mirror reflects incident infrared radiation of interest onto a pyroelectric sensor element. To prevent extraneous radiation from reaching the sensor element, the mirror has a reflective layer for reflecting infrared radiation of interest, and an absorptive layer disposed behind the reflective layer for absorbing extraneous radiation which has passed through the reflective layer. Infrared radiation of interest includes human body thermal radiation, and extraneous radiation includes the visible spectrum. Doped indium-tin oxide (ITO) is preferred for the reflective layer.

20 Claims, 2 Drawing Sheets

INFRARED INTRUSION DETECTOR WITH A MULTI-LAYER MIRROR

BACKGROUND OF THE INVENTION

The invention is in the field of infrared intrusion detectors. Such detectors are designed to sense infrared radiation from persons or objects in a spatial region and to respond to movement by them. The detectors include one or more infrared sensors, with each sensor typically including two or more pyroelectric sensor elements for producing an electrical signal if incident infrared radiation varies. The infrared radiation enters a detector housing through an infrared-permeable entrance window and is focused onto the sensor elements by suitable optical elements, e.g., focusing mirrors or Fresnel-lens entrance windows.

For selective sensing of infrared radiation with wavelengths in a vicinity of 10 μm as emitted by warm bodies, and as distinguished from extraneous electromagnetic radiation at other wavelengths, infrared intrusion detectors are provided with optical filters such as interference filters, for example. Such filters are preferably disposed near the pyrosensors.

It has been found that, even when equipped with high-quality interference filters, such infrared detectors respond to electromagnetic radiation at wavelengths considerably shorter than 10 μm, causing false alarms. As a countermeasure, scatter filters have been included, taking the form of pigmented entrance windows with wavelength-dependent scattering of incident radiation. Such a pigmented entrance window is disclosed in European Patent Document EP-A-0 440 112, for example.

A similar effect can be achieved by a mirror surface which is roughened for desired wavelength selectivity. With such a surface, infrared radiation at predetermined wavelengths can be focused on a sensor element while extraneous radiation is diffusely scattered. Such a roughened mirror surface is disclosed in European Patent Document EP-A-0 617 389, for example.

With scatter filters and mirrors alike, the output signal of the pyrosensor depends on detector geometry, e.g., mirror geometry, pyrosensor aperture, and distance of the sensor from the scattering element. These parameters are then chosen to scatter the extraneous radiation in the detector so that it reaches the pyrosensor with an intensity below an alarm threshold. This tends to be difficult to achieve with sufficient certainty.

SUMMARY OF THE INVENTION

For improved control of extraneous radiation away from sensor elements, in the interest of minimizing false alarms, a mirror in an infrared intrusion detector comprises first and second layers here designated as reflective and absorbing layers, respectively. The reflective layer strongly reflects radiation in a predetermined wavelength range characteristic of human body thermal radiation, and is permeable or transparent to extraneous radiation at lesser wavelengths including the visible range. Preferably, the transition from reflection to permeation is in a wavelength range from 4 μm to 7 μm. The absorbing layer is made of a "dark" material, here understood as being significantly absorbing at wavelengths of extraneous radiation which has passed through the reflective layer.

In a first preferred embodiment, the reflective layer is a doped semiconductor layer, preferably an indium-tin oxide (ITO) layer. ITO is an n-type semiconductor which has a very wide bandgap of 3.3 eV and which can be doped so heavily that the free plasma wavelength is in the near infrared. Since ITO layers are hard, wear resistant and chemically inert, they have a long useful life with essentially constant characteristics.

In a second preferred embodiment, the reflective layer is a thin metal layer. Gold and other noble metals are preferred metals.

In a third preferred embodiment, the reflective layer consists of an interference filter consisting of a plurality of sub-layers. Zinc sulfide and germanium are among suitable sub-layer materials.

In a further preferred embodiment, the absorbing layer consists of a dark plastic or metal.

A mirror of the invention can be included as one of several mirrors in an infrared detector including, e.g, primary and secondary mirrors. Preferably, a mirror of the invention is included as a secondary mirror.

DETAILED DESCRIPTION OF PREFERRED EMBODIMENTS

Figure 1:
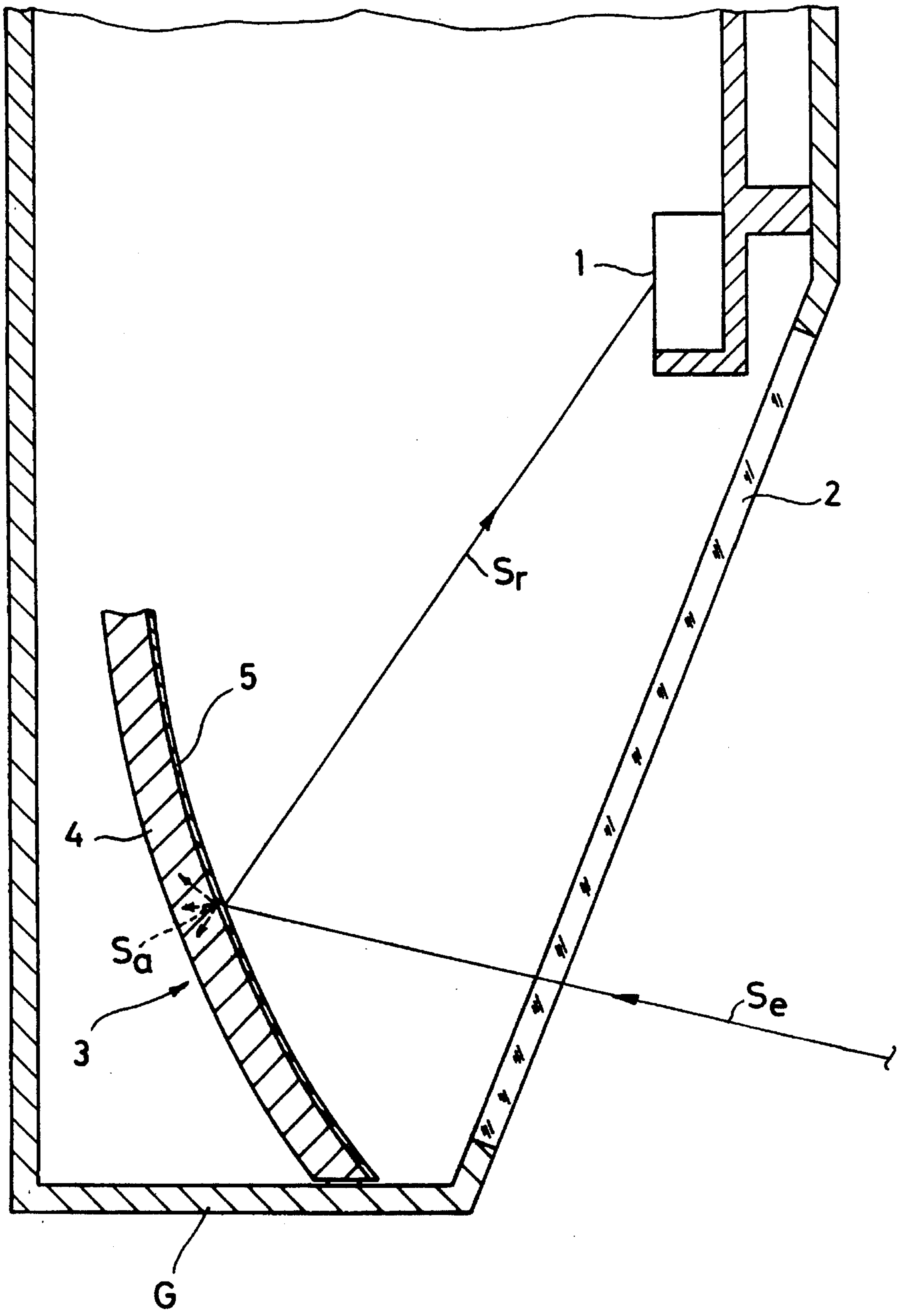
FIG. 1 is a schematic cross section, enlarged, of an infrared intrusion detector with a mirror in accordance with the invention.

The infrared intrusion detector of FIG. 1 has a housing G with a pyrosensor 1, an entrance window 2 for radiation $S_e$ from premises to be monitored, and a mirror 3. The mirror 3 serves to reflect and focus radiation incident through the entrance window 2 from a solid-angle region onto the pyrosensor 1 as radiation $S_r$. Not shown individually, but understood as included with the pyrosensor, are evaluation circuitry with signaling means connected to the pyrosensor for communicating an intrusion alarm signal to a signaling and control center, for example. To the extent of the detailed description so far, infrared intrusion detectors of this type are marketed by Cerberus AG under designations DR413/414 and DR421. For a more detailed description of such infrared intrusion detectors, see European Patent Document EP-A-0 361 224 and its counterpart U.S. Pat. No. 4,990,783 which is herein incorporated by reference.

In accordance with an aspect of the invention, the mirror 3 has at least two layers, namely an absorbing layer 4 and a reflective layer 5, with the reflective layer being reached by the incident radiation ahead of the absorbing layer. Typically, as shown, the absorbing layer serves as a substrate for the reflective layer, but use of a separate substrate is not precluded. And a further layer may be included such as a coating layer applied to the reflective layer, consisting of magnesium fluoride, $MgF_2$, for example.

Typically, an infrared intrusion detector includes more than one mirror in an arrangement comprising at least one primary mirror and at least one secondary mirror. Incident radiation first reaches a primary mirror. Radiation reflected by the primary mirror falls onto the smaller secondary mirror for further reflection and focusing onto the pyrosensor. Preferably, in such an arrangement, it is the secondary mirror which has a layered structure as described above.

The reflective layer 5 is a so-called heat mirror having high reflectivity for "warm" radiation, e.g., infrared radiation in the 4-to-15 micrometer wavelength range which is typical of human body thermal radiation, and is transparent to radiation at wavelengths below about 4 μm including the visible spectrum. The reflective layer may be a very thin metal layer, preferably a gold layer, it may be a multi-layer interference filter composed of zinc sulfide or germanium, for example, or it may be a doped semiconductor layer. Particularly suited is an indium-tin oxide (ITO) layer, such layers being known as industrially applied, e.g., to window glass for office buildings, to transparent plastic parts such as automotive sliding roofs and insulating bottles for cooled beverages, and to conductive articles such as solar cells and integrated-circuit packages. ITO is an n-type semiconductor which has a very wide bandgap of 3.3 eV and which can be doped so heavily that the free plasma wavelength is in the near infrared. Thus, the wavelength selectivity or filter property of an ITO layer is a material property. An ITO layer can be formed by reactive magneto sputtering, for example.

The absorbing layer 4 may consist of a dark plastic, preferably black ABS (acrylonitrile-butadiene-styrene polymer) or of deep-drawn black metal, the dark color serving to impart the desired absorptivity to the layer 4. Optical activity of the doped semiconductor disposed on the dark layer depends on the dielectric properties of the former. Wavelengths reflected are separated from wavelengths transmitted at the free surface of the reflective layer 5. Above a critical minimum thickness, wavelength selectivity depends only slightly on the thickness of the reflective layer 5.

Advantageously further, ITO layers are hard, wear resistant and chemically inert, for a long useful life of the mirror with essentially constant characteristics.

Radiation $S_e$ incident on the mirror 3 through the entrance window 2 either is reflected by the reflective layer 5 and focused on the pyrosensor 1 as ray $S_r$, or it passes through the reflective layer 5 and enters the absorbing layer 4 as rays $S_a$ where it is absorbed.

Whether radiation $S_e$ incident on the mirror 3 is reflected or absorbed depends on wavelength. Reflected are wavelengths in an exemplary range from 4 μm to 15 μm which is typical of human body thermal radiation. Shorter wavelengths are absorbed. In ITO, a desired filter edge can be realized by an appropriate choice of dopant concentration.

If desired for further filter action, a mirror 3 can be used in combination with a scatter filter, e.g., a pigmented entrance window 2 with wavelength-dependent scattering.

Figure 2:
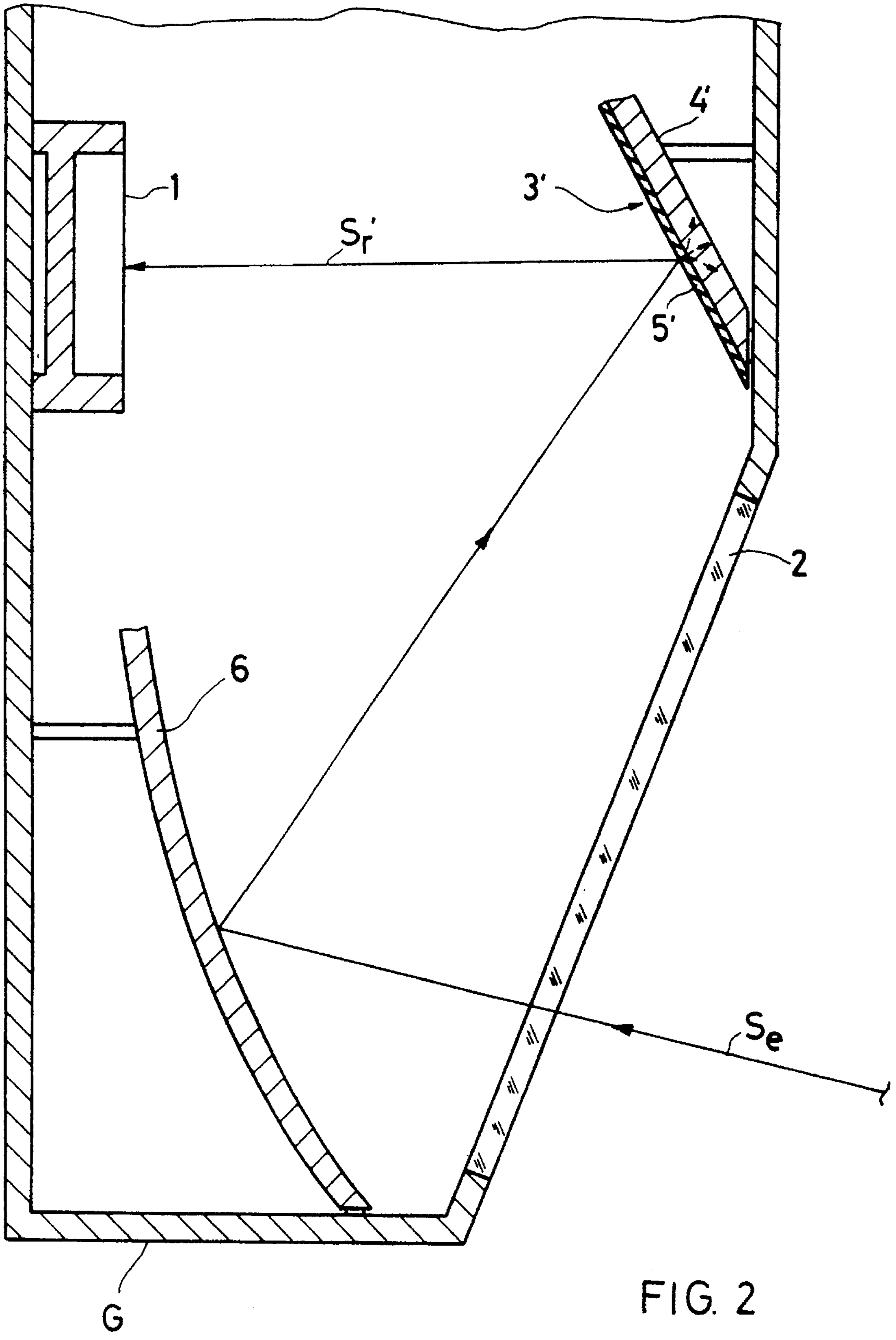
FIG. 2 is a schematic cross section, enlarged, of an infrared intrusion detector including a primary mirror and a secondary mirror in accordance with the invention.

Illustrating an infrared intrusion detector including more than one mirror, FIG. 2 shows a housing G with a pyrosensor 1, an entrance window 2 for radiation $S_e$ from premises to be monitored, and mirror means comprising a primary mirror 6 and a secondary mirror 3' for focusing the radiation onto the pyrosensor 1 as radiation $S_r'$. The secondary mirror 3' has an absorbing layer 4' and a reflective layer 5'. Functionally in accordance with the invention, this structure corresponds to the structure described above for the mirror 3 having an absorbing layer 4 and a reflective layer 5.

We claim:

1. An infrared intrusion detector comprising:

a housing having entrance means for admitting infrared radiation, the entrance means being substantially permeable to infrared radiation of interest, infrared sensor means disposed in the housing, and mirror means disposed in the housing for focusing admitted infrared radiation onto the infrared sensor means, the mirror means comprising a layered mirror having (i) a first layer which is substantially reflective with respect to infrared radiation of interest having a wavelength which is greater than a predetermined wavelength and substantially transparent with respect to electromagnetic radiation having a wavelength which is less than the predetermined wavelength, and (ii) a second layer which is composed of dark material, the second layer supporting the first layer;

wherein the first layer is an indium-tin oxide semiconductor layer having a free plasma wavelength in a wavelength range from 4 μm to 7 μm.

2. The infrared intrusion detector of claim 1, wherein the second layer consists essentially of an acrylonitrile-butadiene-styrene polymer.

3. The infrared intrusion detector of claim 1, wherein the second layer is a metal layer.

4. The infrared intrusion detector of claim 1, further comprising a protective layer on the first layer.

5. The infrared intrusion detector of claim 1, wherein the layered mirror is secondary to a primary mirror which is included in the mirror means.

6. An infrared intrusion detector comprising:

a housing having entrance means for admitting infrared radiation, the entrance means being substantially permeable to infrared radiation of interest, infrared sensor means disposed in the housing, and mirror means disposed in the housing for focusing admitted infrared radiation onto the infrared sensor means, the mirror means comprising a layered mirror having (i) a first layer which is substantially reflective with respect to infrared radiation of interest having a wavelength which is greater than a predetermined wavelength and substantially transparent with respect to electromagnetic radiation having a wavelength which is less than the predetermined wavelength, and (ii) a second layer which is composed of dark material, the second layer supporting the first layer;

wherein the second layer consists essentially of an acrylonitrile-butadiene-styrene polymer.

7. The infrared intrusion detector of claim 6, wherein the first layer is a doped semiconductor layer.

8. The infrared intrusion detector of claim 7, wherein the doped semiconductor layer comprises indium-tin oxide.

9. The infrared intrusion detector of claim 6, wherein the first layer comprises a plurality of sub-layers forming an interference filter.

10. The infrared intrusion detector of claim 6, further comprising a protective layer on the first layer.

11. The infrared intrusion detector of claim 6, wherein the layered mirror is secondary to a primary mirror which is included in the mirror means.

12. A focusing mirror for an infrared intrusion detector, comprising:

a first layer which is substantially reflective with respect to infrared radiation of interest having a wavelength which is greater than a predetermined wavelength and substantially transparent with respect to electromagnetic radiation having a wavelength which is less than the predetermined wavelength, and a second layer which is composed of dark material, the second layer supporting the first layer;

wherein the first layer is an indium-tin oxide semiconductor layer having a free plasma wavelength in a wavelength range from 4 μm to 7 μm.

13. The focusing mirror of claim 12, wherein the second layer consists essentially of an acrylonitrile-butadiene-styrene polymer.

14. The focusing mirror of claim 12, wherein the second layer is a metal layer.

15. The focusing mirror of claim 12, further comprising a protective layer on the first layer.

16. A focusing mirror for an infrared intrusion detector, comprising:

a first layer which is substantially reflective with respect to infrared radiation of interest having a wavelength which is greater than a predetermined wavelength and substantially transparent with respect to electromagnetic radiation having a wavelength which is less than the predetermined wavelength, and a second layer which is composed of dark material, the second layer supporting the first layer;

wherein the second layer consists essentially of an acrylonitrile-butadiene-styrene polymer.

17. The focusing mirror of claim 16, wherein the first layer is a doped semiconductor layer.

18. The focusing mirror of claim 17, wherein the doped semiconductor layer comprises indium-tin oxide.

19. The focusing mirror of claim 16, wherein the first layer comprises a plurality of sub-layers forming an interference filter.

20. The focusing mirror of claim 16, further comprising a protective layer on the first layer.

* * * * *